March 8, 1938.　　　R. H. SHENK　　　2,110,844

FLEXIBLE SHAFT COUPLING

Filed Sept. 28, 1935

INVENTOR.
Robert H. Shenk
BY
ATTORNEYS.

Patented Mar. 8, 1938

2,110,844

UNITED STATES PATENT OFFICE 2,110,844

FLEXIBLE SHAFT COUPLING

Robert H. Shenk, Erie, Pa., assignor to American Flexible Coupling Company, Erie, Pa., a corporation of Pennsylvania Application September 28, 1935, Serial No. 42,653

4 Claims. (Cl. 64—31)

The present invention is designed to improve flexible couplings of the Oldham type and is particularly directed to the improvement of the torque transmitting member or block of the coupling.

In the present invention the transmitting member or block is of rectangular shape and is formed of sheet metal and of at least four connected side plates. Two of these plates engage the walls of one of the cross slots and two of the plates the walls of the cross slot in the opposing member. Features and details of the invention will appear from the specification and claims.

A preferred embodiment of the invention is illustrated in the accompanying drawing as follows:—

Figure 1:
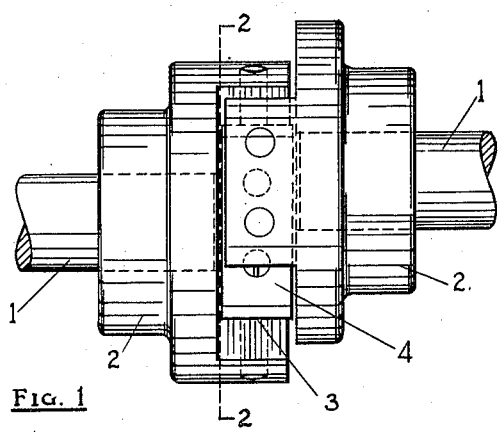
Fig. 1 shows a side elevation of the coupling off-set beyond the ordinary working range.
Figure 2:
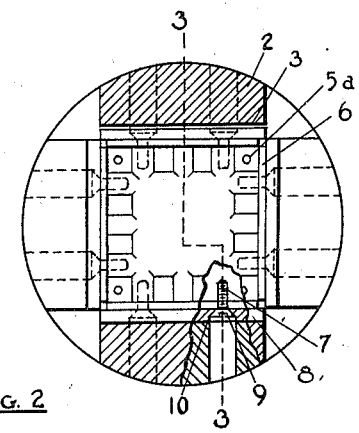
Fig. 2 is a section on the line 2—2 in Fig. 1, except that the coupling is not offset in this figure.

1 marks the shafts which are connected through the coupling, and 2 coupling members fixed on the shaft, each member being provided with a cross slot 3. A rectangular block 4 is slidingly mounted in the slots 3 and communicates the torque from one member to the other.

The block illustrated in Figs. 1 to 4 comprises two units, each unit being provided with the side plates 6 and a bridge plate for each unit secured to the edges of the side plates, preferably integrally, each unit therefore being of box form. The block as assembled is made up of the two units placed back to back, the bridge plates of the units being secured together, preferably by spot welding, as at 5a.

At least one of the bridge plates (preferably both) has grooves stamped in it, these grooves forming openings 7 which are screw threaded to receive screws 9, the screws securing wear plates 8 on the faces of the blocks. The wear plates are provided with openings, through which the screws extend, and in this simple manner the block is fabricated and requires no machining except the threading of these openings, provided screws are used as the securing means for the wear plates, in which case, if desired, the openings may be made slightly undersize and thus cause a certain amount of springing between the bridge plates when the screw is driven, tending to lock it against loosening.

The plate formation permits the use of stamping or drawn tubes in the fabrication of the blocks, thus cheapening the construction of the block and also providing blocks of sufficient strength of less weight than blocks heretofore used.

At least one of the bridge plates, and preferably both of them, has depressions 11 struck up in them, which when the plates are secured together form a receptacle for holding the lubricant. Grooves 12 are also stamped in at least one of the plates, and these grooves extending from the receptacle form openings leading to the openings 13 in the wear plates, thus conveying lubricant to the wear surfaces between the walls of slots 3 and the block.

Figure 3:
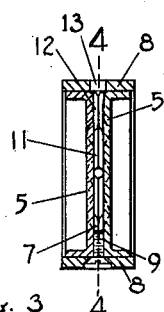
Fig. 3 is a section of the block on the line 3—3 in Fig. 2.
Figure 4:
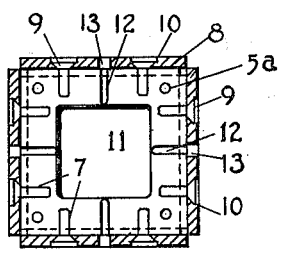
Fig. 4 is a section on the line 4—4 in Fig. 3.
Figure 5:
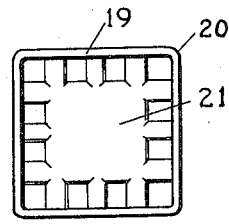
Fig. 5 is an end view of the block similar to that shown in Figs. 1 to 4, except that the corners of the side plates are integrally connected.

The modification shown in Fig. 5 shows a block similar to that in Figs. 1 to 4, except that the side plates 19 are integrally joined to their corners 20, the bridge plates 21 being identical with those shown in Figs. 1 to 4 and the block being formed of two units secured together in the manner shown in Fig. 4.

Figure 6:
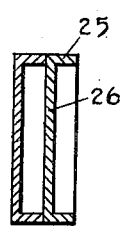
Fig. 6 shows the block formed with two units, each comprising side plates extending flangewise from bridge plates forming two box-shaped units with the closed face of one unit secured to the open face of the other unit.

The modification shown in Fig. 6 has two units, each with a bridge plate 26 connecting four side plates 25. Each unit is of box form with a bridge plate or closure plate at its edge, the units being secured together with the closed face of one unit secured to the open face of the companion unit.

Figure 7:
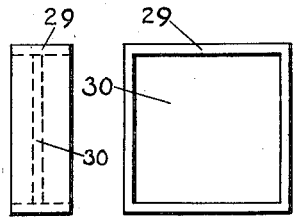
Fig. 7 is a side elevation of a modification in which the side plates are in the form of a tube, and a bridge or brace piece is secured within the side plates intermediate their edges.
Figure 8:
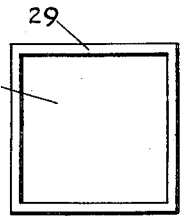
Fig. 8 shows an end view of the modification shown in Fig. 7.

In Figs. 7 and 8 a modification is shown in which the side plates are integrally secured at the corners of the block, and these side plates 29 are braced by one or more bridge plates 30 secured to the inner faces of the side plates and intermediate the edges of the side plates.

While I have shown in Figs. 3 and 4 the wear plates 8, it will be understood that in the broader phases of the invention these may, or may not, be used.

What I claim as new is:—

1. The combination with cross slotted members of a flexible shaft coupling of a rectangularly shaped transmitting block slidingly mounted in the slots, said block comprising two units, each having side walls the outer faces of which form bearing surfaces sliding on the surfaces of the walls of the slots and a bridge plate formed integrally with the side walls and bridging the space between the side walls, said units being united with their side walls in common planes with the bridge plates secured together back to back.

2. The combination with cross slotted members of a flexible shaft coupling of a rectangularly shaped transmitting block slidingly mounted in the slots, said block comprising two units, each having side walls the outer faces of which form bearing surfaces sliding on the surfaces of the walls of the slots and a bridge plate formed integrally with the side walls and bridging the space between the side walls, said units being united with their side walls in common planes with the bridge plates secured together back to back, said units enclosing a cavity for the reception of a lubricant.

3. The combination with cross slotted members of a flexible shaft coupling of a rectangularly shaped transmitting block slidingly mounted in the slots, said block comprising two units, each having side walls and a bridge plate connected with the side walls and bridging the space between the side walls, said units being united with their side walls in common planes, with the bridge plates back to back and at least one of the bridge plates being formed with a depression, forming in the united block a receptacle, at least one of the bridge plates having formed therein grooves leading from the receptacle to the face of the block.

4. The combination with cross slotted members of a flexible shaft coupling of a rectangularly shaped transmitting block slidingly mounted in the slots, said block comprising two units, each having side walls and a bridge plate connected with the side walls and bridging the space between the side walls, said units being united with their side walls in common planes with the bridge plates back to back and the bridge plate of at least one unit having grooves formed therein, which in the completed block form openings; wear plates on the side plates and devices extending from the wear plates into the openings formed between the bridge plates securing the wear plates on the side plates, said devices having a greater cross dimension in the initial openings formed by the grooves.

ROBERT H. SHENK.